(12) United States Patent
Aleshin et al.

(10) Patent No.: US 8,594,269 B2
(45) Date of Patent: Nov. 26, 2013

(54) NUCLEAR FUEL ASSEMBLIES WITH STRUCTURAL SUPPORT REPLACEMENT RODS

(75) Inventors: Yuriy Aleshin, Columbia, SC (US); James A. Sparrow, Irmo, SC (US); Keith J. Drudy, Pittsburgh, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 1215 days.

(21) Appl. No.: 11/332,058

(22) Filed: Jan. 13, 2006

(65) Prior Publication Data

US 2007/0165766 A1   Jul. 19, 2007

(51) Int. Cl.
*G21C 3/34*   (2006.01)

(52) U.S. Cl.
USPC .......................................... 376/438; 376/462

(58) Field of Classification Search
USPC .......... 176/68, 76, 78, 50; 376/438, 353, 327, 376/449, 457, 261, 442, 441, 462; 168/159
See application file for complete search history.

(56) References Cited

U.S. PATENT DOCUMENTS

| | | | | |
|---|---|---|---|---|
| 3,267,000 | A | * | 8/1966 | Ashcroft ........................ 376/447 |
| 4,124,443 | A | * | 11/1978 | Bezold ............................ 376/434 |
| 4,285,771 | A | * | 8/1981 | Downs ............................ 376/438 |
| 4,652,426 | A | * | 3/1987 | Boyle et al. .................... 376/352 |
| 4,863,681 | A | * | 9/1989 | Hatfield ......................... 376/451 |
| 5,073,336 | A | * | 12/1991 | Taylor ............................ 376/457 |
| 5,493,592 | A | * | 2/1996 | Garzarolli et al. ............. 376/416 |
| 5,610,959 | A | * | 3/1997 | Fecteau et al. ................ 376/419 |
| 5,666,389 | A | * | 9/1997 | Andersson et al. ............ 376/462 |
| 5,966,419 | A | * | 10/1999 | Petit .............................. 376/441 |

FOREIGN PATENT DOCUMENTS

| | | | |
|---|---|---|---|
| RU | 2093906 | * | 10/1997 |
| RU | 2246142 | * | 10/2005 |

OTHER PUBLICATIONS

Yu. Bibliashviily et al. Development of Alternative Fuel Assembly for WWER-1000 Reactor, Proc. of the Second Internat. Seminar WWER Reactor, Fuel Performance, Modeling and Experimental support, Apr. 1997, Sandanski, Bulgaria.*
Kreith et al, Editor "The CRC Handbook of Mechanical Engineering", CRC Press, 2005; CRC Press, Sep. 2004.*
Samoilov et al., "Alternative Fuel for WWER-1000: Concept, Design, Results of Experimental Operation," International Seminar: WWER Reactor—Fuel Performance, Modeling and Experimental Support, Oct. 1998, Pamporovo, Bulgaria.

(Continued)

*Primary Examiner* — Johannes P Mondt
(74) *Attorney, Agent, or Firm* — Joseph C. Spadacene; Westinghouse Electric Company LLC

(57) ABSTRACT

The present invention provides novel fuel assemblies for use with PWR nuclear reactors and power plants, and in particular, VVER nuclear reactors. The fuel assemblies offer enhanced structural stability, skeletal rigidity, and distortion (bow and twist) resistance to support high burn-up fuel management. Each fuel assembly may include a plurality of fuel rods, a plurality of control rods and guide thimbles, at least one instrumentation tube, and a plurality of grids. At least one fuel rod is replaced with a structural support replacement rod made from zirconium (Zr) alloy, stainless steel, or any other suitable material. The structural support replacement rod may be hollow or solid. The structural support replacement rods are preferably disposed at or about the periphery, and in some cases, the corners of the geometric array, which is preferably a hexagon or square.

15 Claims, 9 Drawing Sheets

(56) References Cited

OTHER PUBLICATIONS

Akseonov et al., "Results of Alternative FA Creation and 3-Years Operation in WWER-1000 Reactor at Kalinin NPP-1," Proceedings of the Fourth International Conference: WWER Fuel—Performance, Modeling and Experimental Support, Oct. 2001, Vama, Bulgaria.

Bibilashvily et al., "Development of Alternative Fuel Assembly for WWER—1000 Reactor," Proceedings of the Second International Seminar: WWER Reactor—Fuel Performance, Modeling and Experimental Support, Apr. 1997, Sandanski, Bulgaria.

* cited by examiner

NUCLEAR FUEL ASSEMBLIES WITH STRUCTURAL SUPPORT REPLACEMENT RODS

FIELD OF THE INVENTION

The present invention relates to fuel assemblies for nuclear reactors and power plants and, more particularly, to fuel assemblies in which at least one fuel rod has been replaced with a structural support replacement rod.

BACKGROUND INFORMATION

Nuclear power plants typically utilize water to remove the heat created by the fission of an element such as uranium within the nuclear reactor. In a pressurized water reactor (PWR), heat is removed from the reactor by water flowing in a closed pressurized loop. The heat is transferred to a second water loop through a heat exchanger. The second loop is kept at a lower pressure, allowing the water to boil and create steam. The steam is used to turn a turbine-generator and produce electricity. Afterward, the steam is condensed into water and returned to the heat exchanger.

The Voda-Vodyanoi Energetichesky Reaktor (VVER) is the Russian version of a PWR. FIG. 1a presents an elevational view of a standard fuel assembly 2 for use with a VVER. The fuel assembly 2 contains a plurality of fuel rods 3, a plurality of grids 4, a top nozzle 6, and a bottom nozzle 8. FIG. 1b presents a close-up view of Area A shown in FIG. 1a, depicting the top nozzle 6 and top grid 5. FIG. 1c presents a close-up view of Area B shown in FIG. 1a, depicting two mid-grids 7, 9 and a portion of the fuel rods 3. FIG. 1d presents a close-up view of Area C shown in FIG. 1a, depicting the bottom nozzle 8 and bottom grid 10.

Each fuel rod 3 contains uranium oxide pellets that are stacked in cladding. A spring is positioned at the top of the stack to compress the pellets. The fuel rod is closed at both ends by end plugs that are welded to the cladding. Grid springs provide lateral support for the fuel rods 3 and accommodate for growth that occurs during irradiation. Control rods are interspersed among the fuel rods to regulate the nuclear reaction. The control rods slidably move within guide thimbles that are anchored to the grids 4 and/or nozzles 6, 8 by welding. The grids 4 are positioned one on top of the other in a tandem array, usually at regularly spaced intervals. An instrumentation tube may be positioned in the center of the fuel rods and control rods.

FIG. 2 presents a cross-sectional view of section D-D' shown in FIG. 1a. FIG. 2 illustrates the geometric array 11 or shape in which the fuel assembly 2 is contained in a VVER. As shown, the fuel rods 3 are contained within a geometric array 11 that is shaped like a hexagon with six corners 13 (a "hexagonal array"). Control rods 14 and their associated guide thimbles (indicated by the outer circle (i.e., perimeter) surrounding each of the control rods 14 in FIG. 2) are interspersed among the fuel rods 3, and an instrumentation tube 16 is located in the center. Typically, a VVER fuel assembly with a hexagonal array will include 312 fuel rods, 18 control rods and associated guide thimbles, and 1 instrumentation tube. The structural support for the fuel assembly is provided by the grids, the top nozzle, and the bottom nozzle, which are anchored to the guide thimbles. Structural support is also provided by the grid springs which offer some lateral stability to the fuel rods. In addition to hexagonal arrays, VVER fuel assemblies may have square or circular arrays. Square fuel assemblies will typically have a 14×14, 15×15, 16×16, or 17×17 array. A 16×16 array may include 237 fuel rods, 18 control rods and associated guide thimbles, and 1 instrumentation tube.

Unfortunately, standard VVER fuel assemblies may not provide adequate geometric and dimensional stability during irradiation, or sufficient resistance to fuel assembly distortion. Fuel assembly bow and twist measurements, handling incidents, and incomplete rod insertion (IRI) events indicate that standard VVER fuel assembly designs may not adequately support current fuel management schemes with four annual cycles (i.e., four year long fuel cycles, during which time a region of fuel assemblies may remain within the reactor core). Moreover, standard fuel assembly designs may not adequately support proposed fuel management schemes with 6 annual cycles (i.e., six year long fuel cycles, during which time a region of fuel assemblies may remain within the reactor core) and maximum fuel rod burn-up of 75,000 MWD/MTU. Some fuel assemblies have been designed to include structural support straps that wrap around the assembly perimeter. These structural support straps provide an increased resistance to fuel assembly distortion. However, their design has some disadvantages associated with manufacturing problems (e.g., a significant number of weld joints) and thermal-hydraulic limitations (increased fuel assembly pressure drop; decrease in the DNB performance for fuel rods at corner locations).

Thus, there exists a need for a new fuel assembly design that provides adequate structural stability or skeletal rigidity and resistance to distortion to support current and proposed fuel management schemes without degradation of thermal hydraulic performance and without manufacturing problems. The goal is to sustain the fuel supply for as long as possible while at the same time maintaining the power rating of the nuclear reactor.

SUMMARY OF THE INVENTION

The present invention provides novel fuel assemblies for use with PWR nuclear reactors and power plants, and in particular, VVER nuclear reactors. The fuel assemblies offer enhanced structural stability, skeletal rigidity, and distortion resistance to support high burn-up fuel management. Each fuel assembly may include a plurality of fuel rods, a plurality of control rods and guide thimbles, at least one instrumentation tube, and a plurality of grids. At least one fuel rod is replaced with a structural support replacement rod made from zirconium (Zr) alloy, stainless steel, or any other suitable material. Zirconium alloy is preferred because it provides a low neutron capture cross-section, which makes the nuclear reaction more efficient, while maintaining adequate corrosion resistance. The structural support replacement rods may be placed at or about the periphery of the geometric array in which the fuel assembly is contained. In a preferred embodiment, the structural support replacement rods may be placed at or about the corners of the geometric array, which is preferably a hexagon or square.

It is an aspect of the present invention to provide a fuel assembly for a nuclear reactor. The fuel assembly forms a geometric array having a periphery. The fuel assembly comprises: a plurality of fuel rods; a plurality of control rods; a plurality of guide thimbles, wherein the control rods are slidably movable within the guide thimbles; at least one instrumentation tube; at least one structural support replacement rod; and a plurality of grids that are structured and arranged in a tandem array to support the fuel rods, the guide thimbles, the at least one instrumentation tube, and the at least one structural support replacement rod in a spatial relationship in the geometric array, wherein the guide thimbles are anchored to the grids, and wherein at least one of the at least one structural support replacement rod is disposed at or about the periphery of the geometric array in order to provide enhanced structural stability to the fuel assembly.

It is another aspect of the present invention to provide a nuclear reactor including a pressure vessel and a plurality of fuel assemblies housed by the pressure vessel. Each fuel assembly forms a geometric array having a periphery, and comprises: a plurality of fuel rods; a plurality of control rods; a plurality of guide thimbles, wherein the control rods are slidably movable within the guide thimbles; at least one instrumentation tube; at least one structural support replacement rod; and a plurality of grids that are structured and arranged in a tandem array to support the fuel rods, guide thimbles, at least one instrumentation tube, and at least one structural support replacement rod in a spatial relationship in the geometric array, wherein the guide thimbles are anchored to the grids, and wherein at least one of the at least one structural support replacement rod is disposed at or about the periphery of the geometric array in order to provide enhanced structural stability to the fuel assembly.

It is an object of the present invention to provide a novel fuel assembly for use with VVERs.

It is another object of the present invention to provide a fuel assembly with enhanced structural stability, skeletal rigidity, and resistance to distortion (e.g., without limitation, bow and twist).

It is a further object of the present invention to provide a fuel assembly that can support increased fuel burn-up management requirements.

It is another object of the present invention to enhance the structural stability of fuel assemblies having hexagonal or square arrays.

It is a further object of the present invention to utilize structural support replacement rods to enhance the structural stability of a fuel assembly.

These and other objects of the present invention will become more readily apparent from the following detailed description and appended claims.

TABLES

Table 1, which is incorporated hereinbelow in the section Detailed Description of the Preferred Embodiments, presents the results of a skeleton stiffness assessment for fuel assemblies with structural support replacement rods located in various positions.

Table 2, which is incorporated hereinbelow in the section Detailed Description of the Preferred Embodiments, present the results of nuclear assessment calculations for fuel assemblies with structural support replacement rods located in various positions.

BRIEF DESCRIPTION OF THE FIGURES

FIG. 1b presents a close-up elevational view of Area A shown in FIG. 1a.

FIG. 1c presents a close-up elevational view of Area B shown in FIG. 1a.

FIG. 1d presents a close-up elevational view of Area C shown in FIG. 1a.

FIG. 2 presents a cross-sectional view of section D-D' shown in FIG. 1a.

DETAILED DESCRIPTION OF THE PREFERRED EMBODIMENTS

Figure 9:
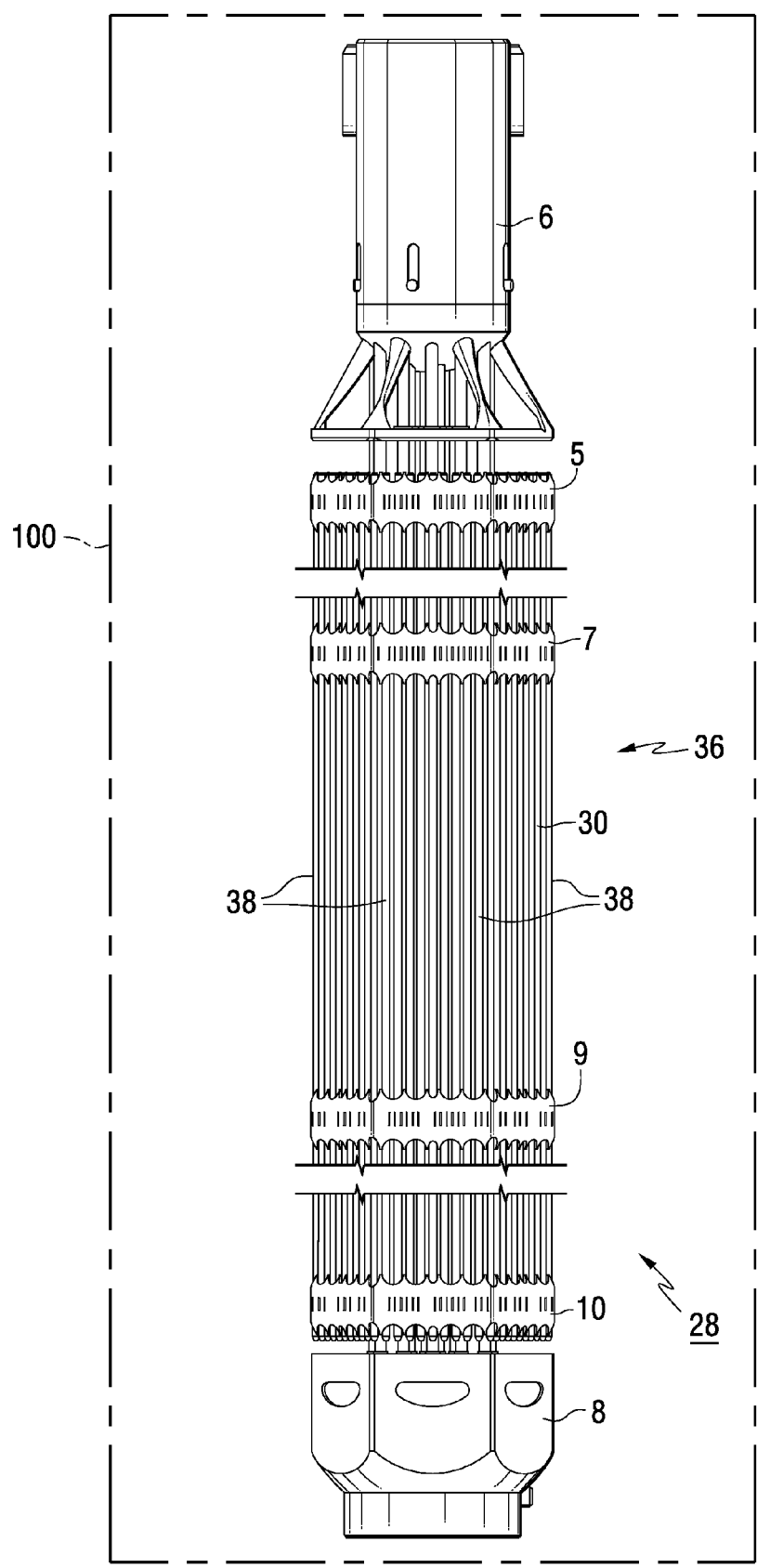
FIG. 9 presents a vertical elevation view of the fuel assembly of FIG. 3.

The present invention provides novel fuel assemblies for use with PWR nuclear reactors and power plants, and in particular, VVER nuclear reactors. The invention contemplates the novel fuel assemblies themselves, as well as nuclear reactors that comprise a fuel assembly surrounded by a pressure vessel 100 (shown in simplified form in FIG. 9) and nuclear power plants that contain one or more fuel assemblies. The fuel assemblies offer enhanced structural stability, skeletal rigidity, and distortion resistance to support high burn-up fuel management. Each fuel assembly may include a plurality of fuel rods, a plurality of control rods and guide thimbles, at least one instrumentation tube, and a plurality of grids. At least one fuel rod is replaced with a structural support replacement rod made from zirconium (Zr) alloy, stainless steel, or any other suitable material. The replacement rod may be hollow or solid. Zirconium alloy is the preferred material because it provides a low neutron capture cross-section, which makes the nuclear reaction more efficient, while maintaining adequate corrosion resistance.

The grids are positioned one on top of the other in a tandem array. The purpose of the grids is to support the fuel rods, guide thimbles, instrumentation tube, and replacement rods in a spatial relationship with respect to each other. The spatial relationship is defined by the fuel assembly's geometric array. As used herein, the term "geometric array" refers to the cross-sectional shape or design in which the fuel assembly is contained, and expressly includes, for example and without limitation, a hexagon, a square, or a circle. In other words, the periphery of the fuel assembly, when viewed in plan view, forms a hexagon, square, or circle. The guide thimbles may be anchored, welded, or coupled to the grids. To provide additional support, the guide thimbles may also be anchored to the top and bottom nozzles of the fuel assembly. Grid springs provide lateral support to the fuel rods and accommodate for growth that occurs during irradiation.

As will be illustrated and discussed herein, the structural support replacement rods are disposed at or about the periphery of the geometric array in which the fuel assembly is contained. In a preferred embodiment, the structural support replacement rods are disposed at or about the corners of the geometric array, which is preferably a hexagon or square. As employed herein, the term "corner" refers to the point on the periphery of the geometric array where two sides of the fuel assembly intersect. Thus, for example, a hexagonal geometric array in accordance with the invention has six corners. For a hexagonal array (FIGS. 2-6, and FIG. 8), the fuel assembly may include between about 1 to about 12 replacement rods, and preferably includes between about 3 to about 6 replacement rods, wherein each replacement rod is placed at or about a corner of the hexagon. However, the present invention is not limited to any particular number of replacement rods or positioning of replacement rods.

Figure 3:
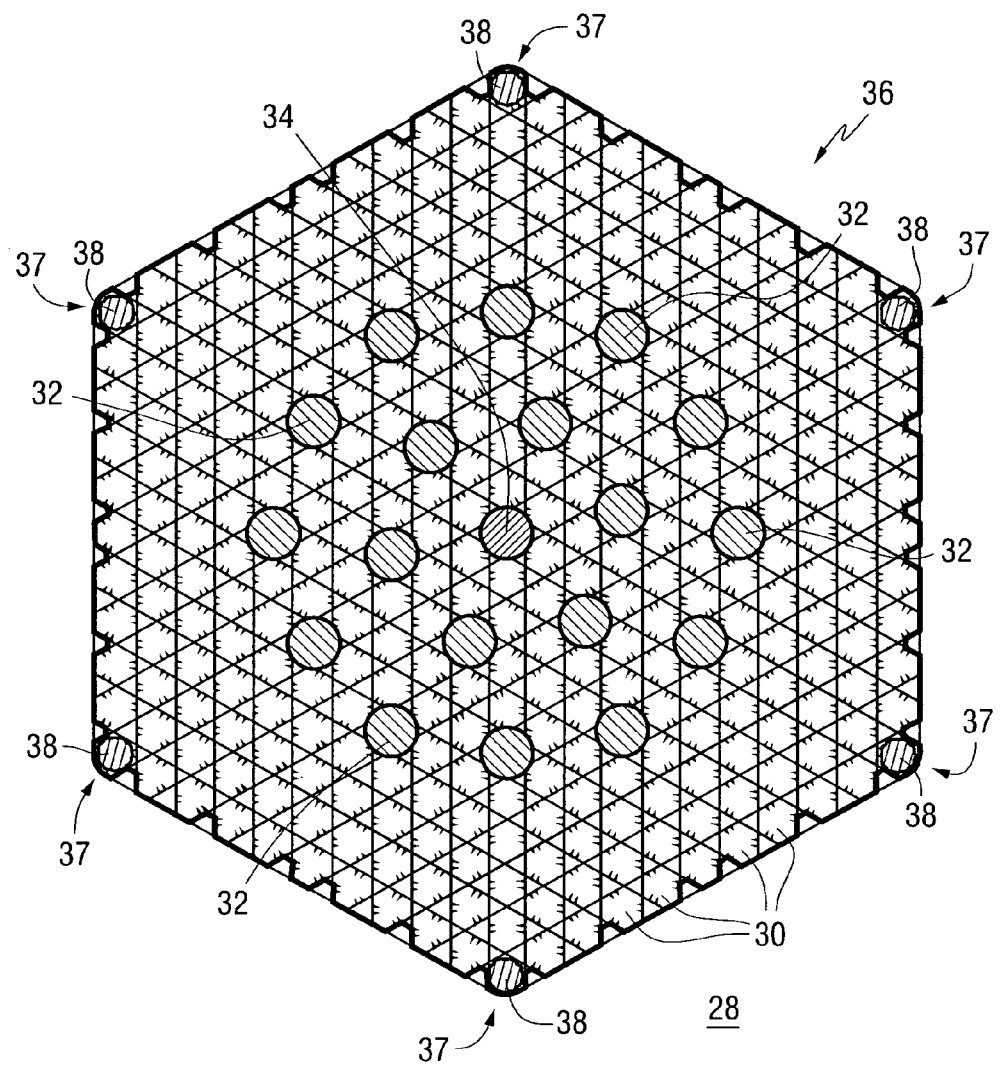
FIG. 3 presents a cross-sectional view of a fuel assembly having a hexagonal array in accordance with a preferred embodiment of the present invention.

FIG. 3 presents a cross-sectional view of a fuel assembly 28 in accordance with a preferred embodiment of the present invention. The fuel assembly 28 includes fuel rods 30, control rods 32 that are slidably movable within guide thimbles (indicated by the outer circle (i.e., perimeter) surrounding each of the control rods 32 in FIG. 3, and an instrumentation tube 34. The fuel assembly 28 is contained within a geometric array 36 that comprises a hexagon with six corners 37. While the present invention primarily focuses on the use of hexagonal (FIGS. 2-6 and FIG. 8) and square arrays (FIG. 7), it is understood that numerous other shapes or designs (not shown) may be utilized, including regular and irregular shapes (not shown), although the geometric array is preferably non-circular in shape. Thus, in accordance with a preferred embodiment, the geometric array has at least one corner (e.g., corner 37 of FIG. 3).

In the example of FIG. 3, the fuel rods adjacent to each corner 37 of the hexagonal array 36 have been replaced with structural support replacement rods 38. In this manner, additional structural stability and skeletal rigidity is provided for the entire fuel assembly 28. Although the structural support replacement rods 38 are preferably made from solid zirconium alloy, it will be appreciated that they could be hollow or solid, and made from any known or suitable material other than zirconium alloy.

FIGS. 4, 5, 6, and 8 show cross-sectional views of exemplary structural support replacement rod configurations within fuel assemblies having hexagonal geometric arrays, in accordance with the present invention. The components of the fuel assemblies in each case are essentially identical with the only difference being the number, location, and/or type (i.e., solid or hollow) of the structural support replacement rods.

Figure 4:
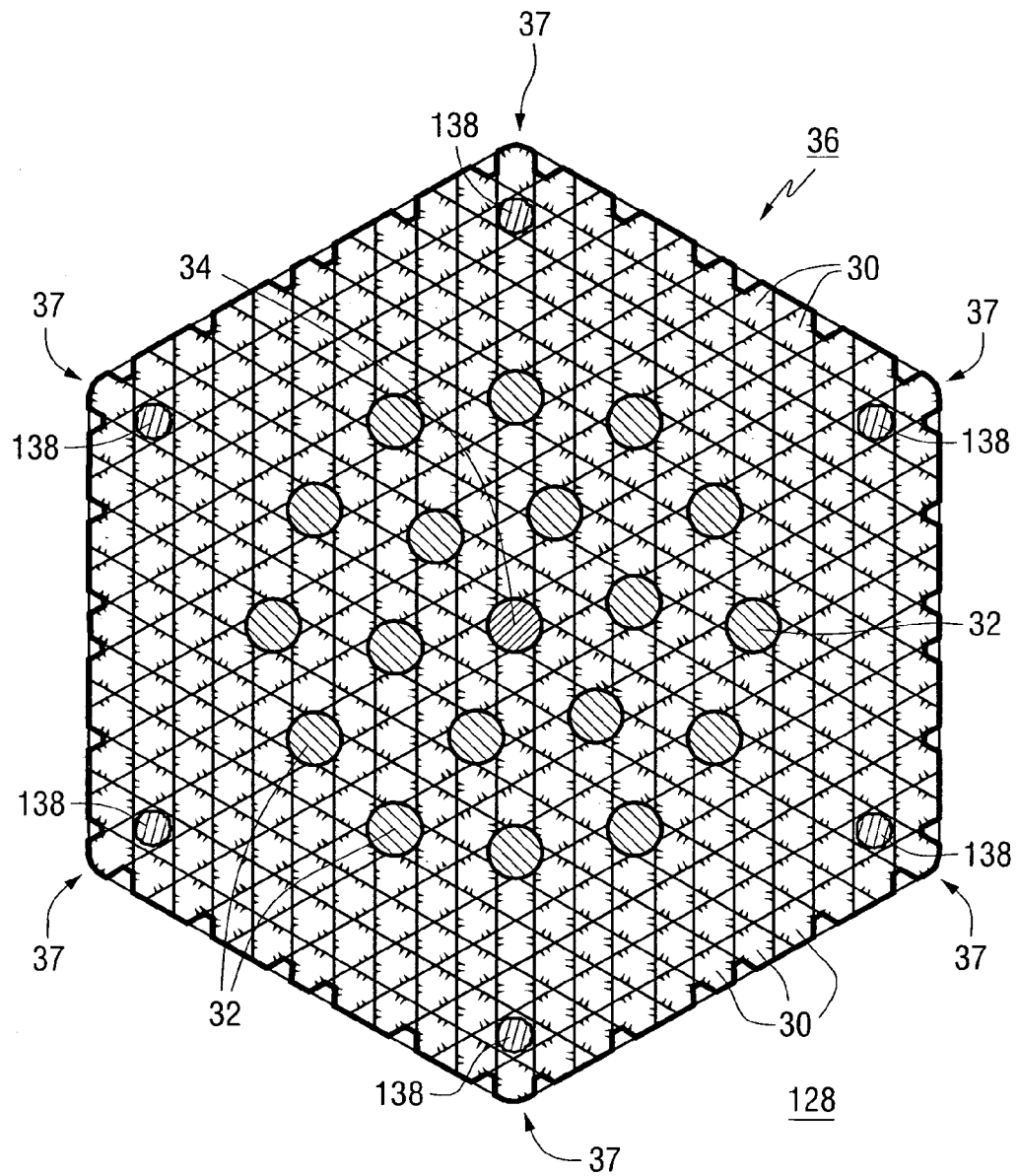
FIG. 4 presents a cross-sectional view of a fuel assembly having a hexagonal array in accordance with a preferred embodiment of the present invention.
Figure 5:
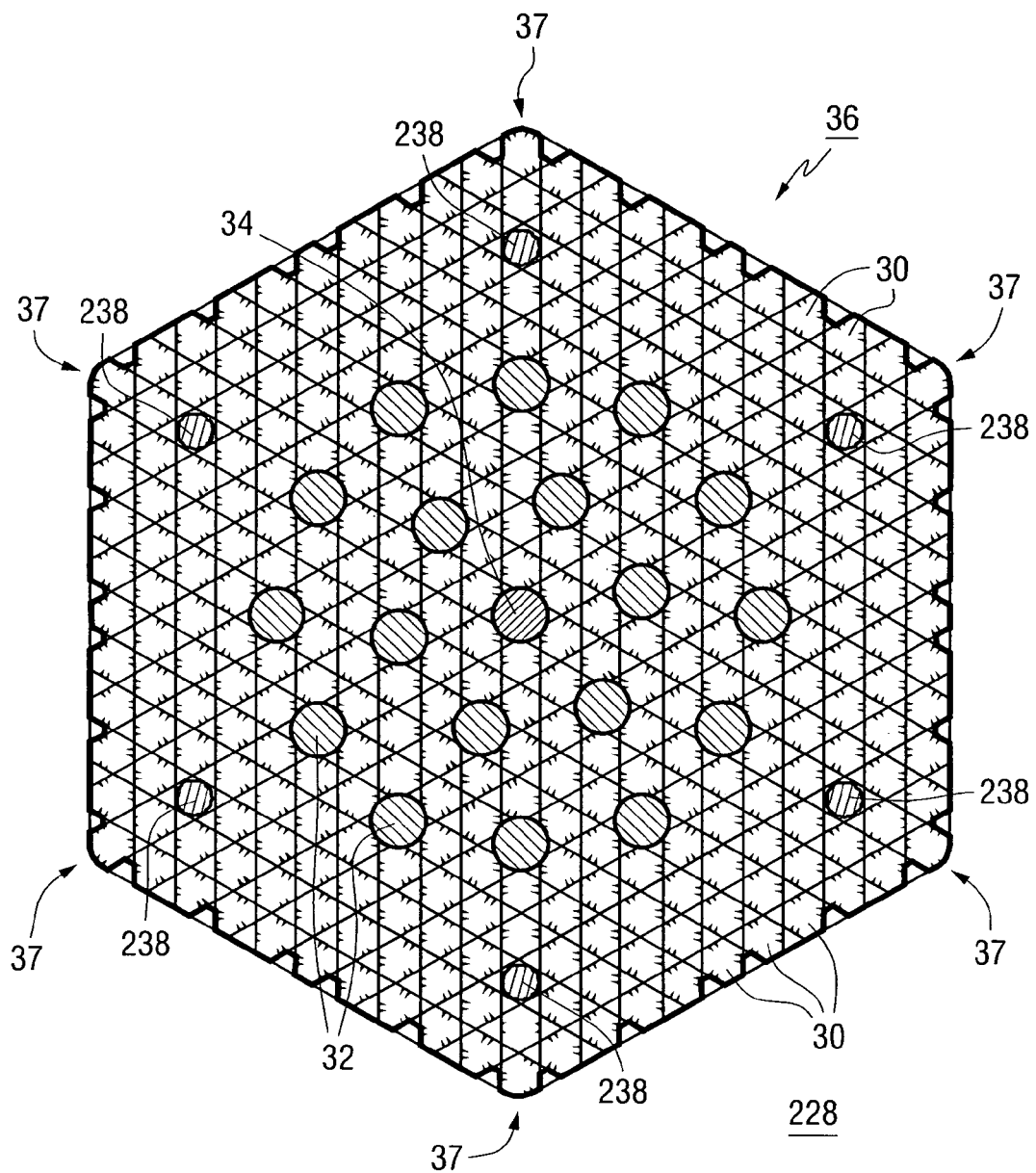
FIG. 5 presents a cross-sectional view of a fuel assembly having a hexagonal array in accordance with a preferred embodiment of the present invention.
Figure 6:
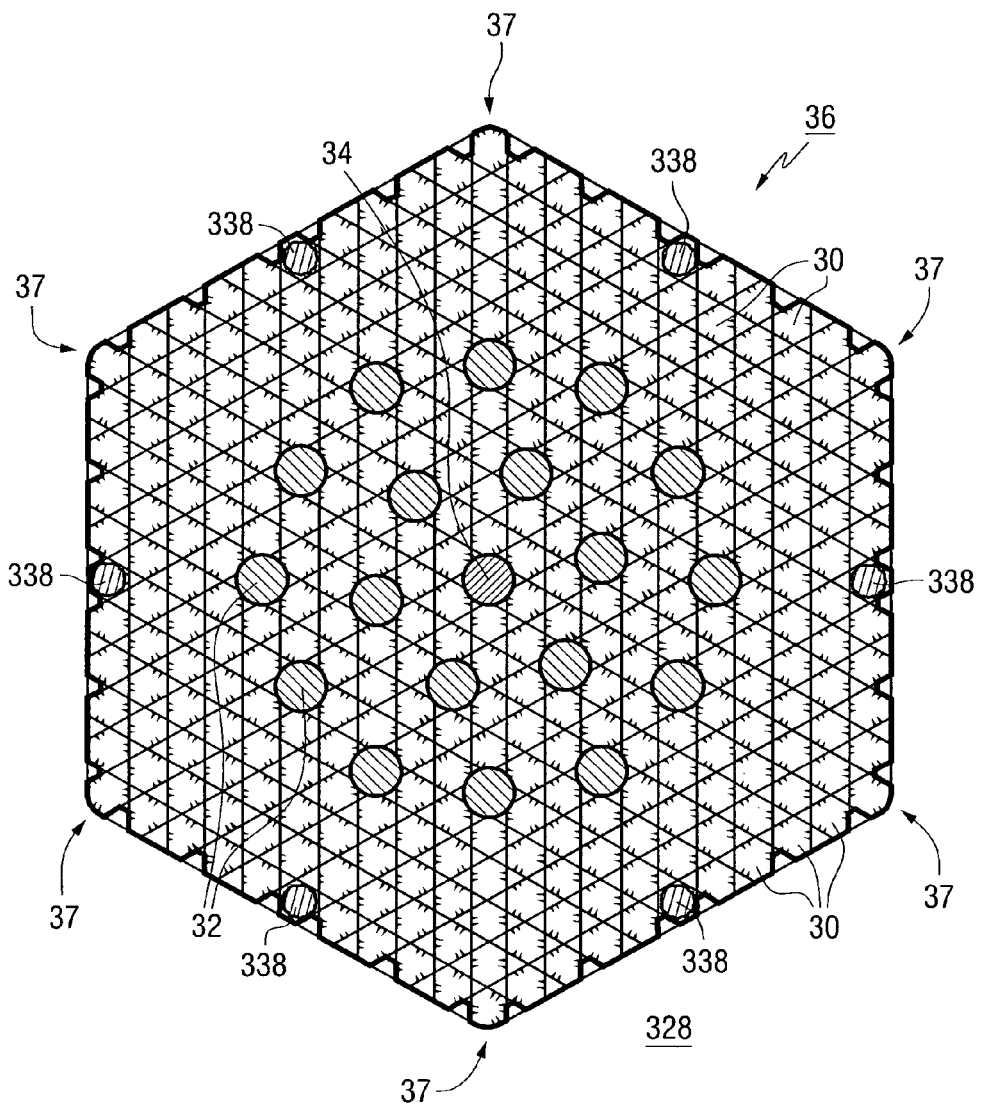
FIG. 6 presents a cross-sectional view of a fuel assembly having a hexagonal array in accordance with a preferred embodiment of the present invention.

More specifically, in the fuel assembly 128 of FIG. 4, six structural support replacement rods 138 have been positioned one fuel rod away from the corners 37 of the hexagonal array 36 to replace six fuel rods 30. In another embodiment of the invention, shown in FIG. 5, six structural support replacement rods 238 have been positioned proximate the corners 37 of the hexagonal array 36 to replace six fuel rods 30 of the fuel assembly 228. More specifically, each of the structural support replacement rods 238 is disposed two fuel rods 30 away from the corners 37, as shown. In the fuel assembly 328 of the example of FIG. 6, six structural support replacement rods 338 replace six fuel rods 30 at a location between the corners 37 of the hexagonal array 36. More specifically, the replacement rods 338 are generally disposed midway between a pair of corners 37 at the periphery of the array 36.

In the embodiments shown in FIGS. 3-6, each fuel assembly includes 306 fuel rods 30, six structural support replacement rods 28,138,238,338, 18 control rods and guide thimbles 32, and one instrumentation tube 34. It will be appreciated, however, that a hexagonal array in accordance with the invention may include as few as about three or less structural support replacement rods to about six or more structural support replacement rods. However, it will also be appreciated that the present invention is not limited to any particular number of fuel rods, replacement rods, control rods, guide thimbles, instrumentation tubes, grids, or nozzles. Generally, the number of structural support replacement rods corresponds to the number that is required to achieve the desired structural stability while balancing the effects of fuel rod replacement on the nuclear reactor's performance.

It will still further be appreciated that the present invention is not limited to any particular positioning of the structural support replacement rods. Each replacement rod may be positioned at any spatial location within the geometric array. This is evidenced by the aforementioned examples of FIGS. 3-6. Specifically, as previously discussed, the replacement rods (e.g., 38,138,238,338) may be positioned at or about the corners 37 of the geometric array (e.g., hexagonal geometric array 36), or the replacement rods may be positioned generally between the corners 37 at or about the periphery of the array 36. Positioning of the structural support replacement rods may be determined so as to: 1) maximize the lateral stiffness of the fuel assembly, and 2) minimize the radial flux peaking near the periphery of the fuel assembly. The latter is important in order to minimize the overall flux peaking within the core to levels deemed acceptable by the plant safety analysis.

Figure 7:
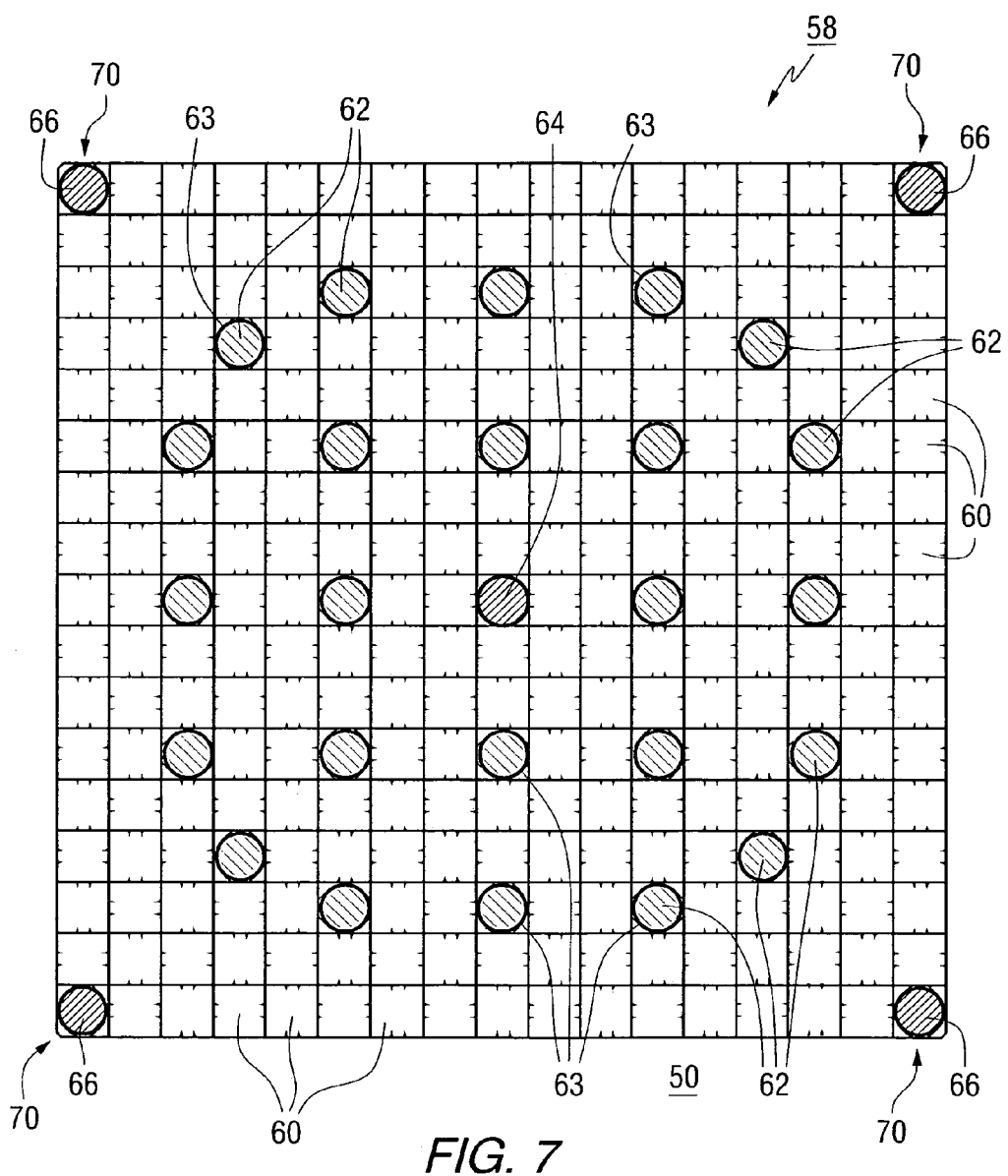
FIG. 7 presents a cross-sectional view of a fuel assembly having a square array in accordance with a preferred embodiment of the present invention.

FIG. 7 presents a cross-sectional view of a fuel assembly 50 with a square array 58 in accordance with an embodiment of the present invention. The square array 58 is preferably 14×14, 15×15, 16×16, or 17×17. In the example of FIG. 7 the fuel assembly 50 has a 17×17 square array 58 with two hundred sixty-four fuel rods 60, twenty control rods 62 and associated guide thimbles 63, one instrumentation tube 64, and four structural support replacement rods 66. The structural support replacement rods 66 are placed at the corners 70 of the square array 58. It will, however, be appreciated that the invention is not limited to any particular size of square array, number of components, or positioning of components.

Figure 1A:
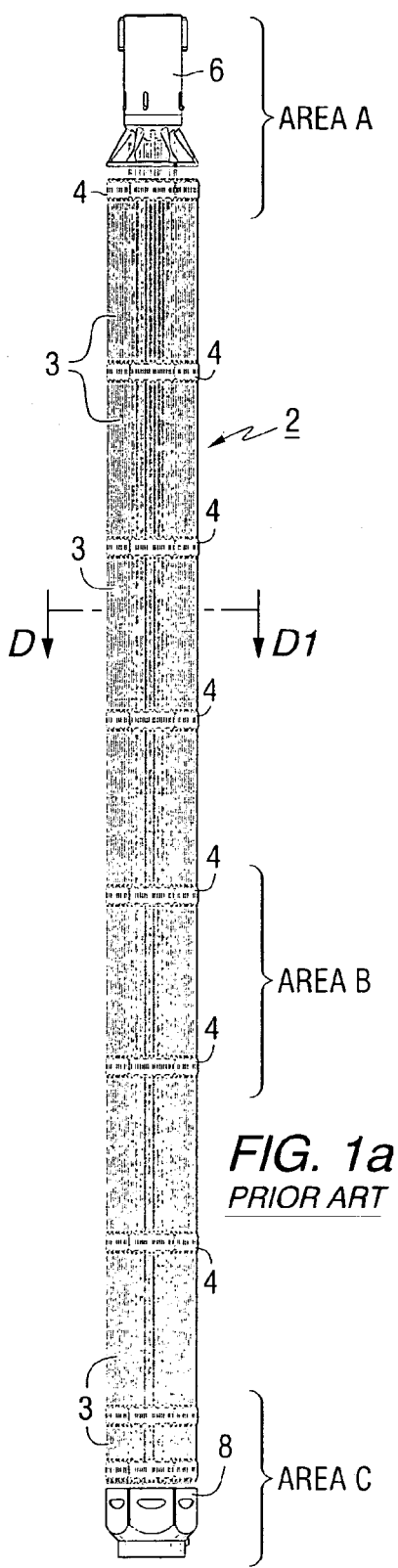
FIG. 1a presents an elevational view of a standard fuel assembly for use with a VVER.
Figure 1B:
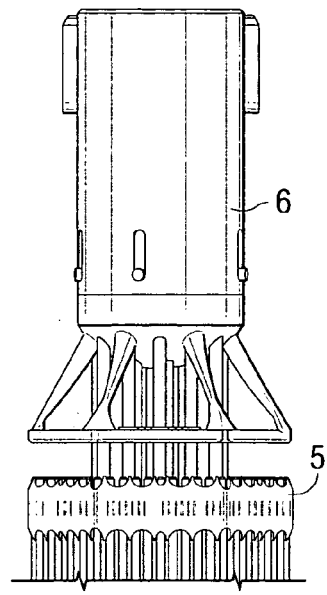
Figure 1C:
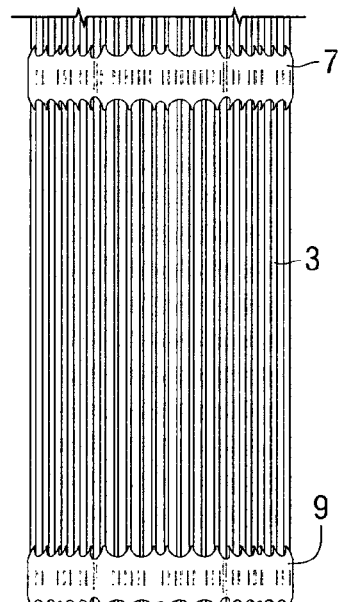
Figure 1D:
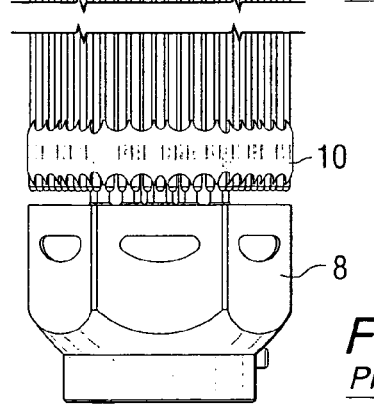
Figure 2:
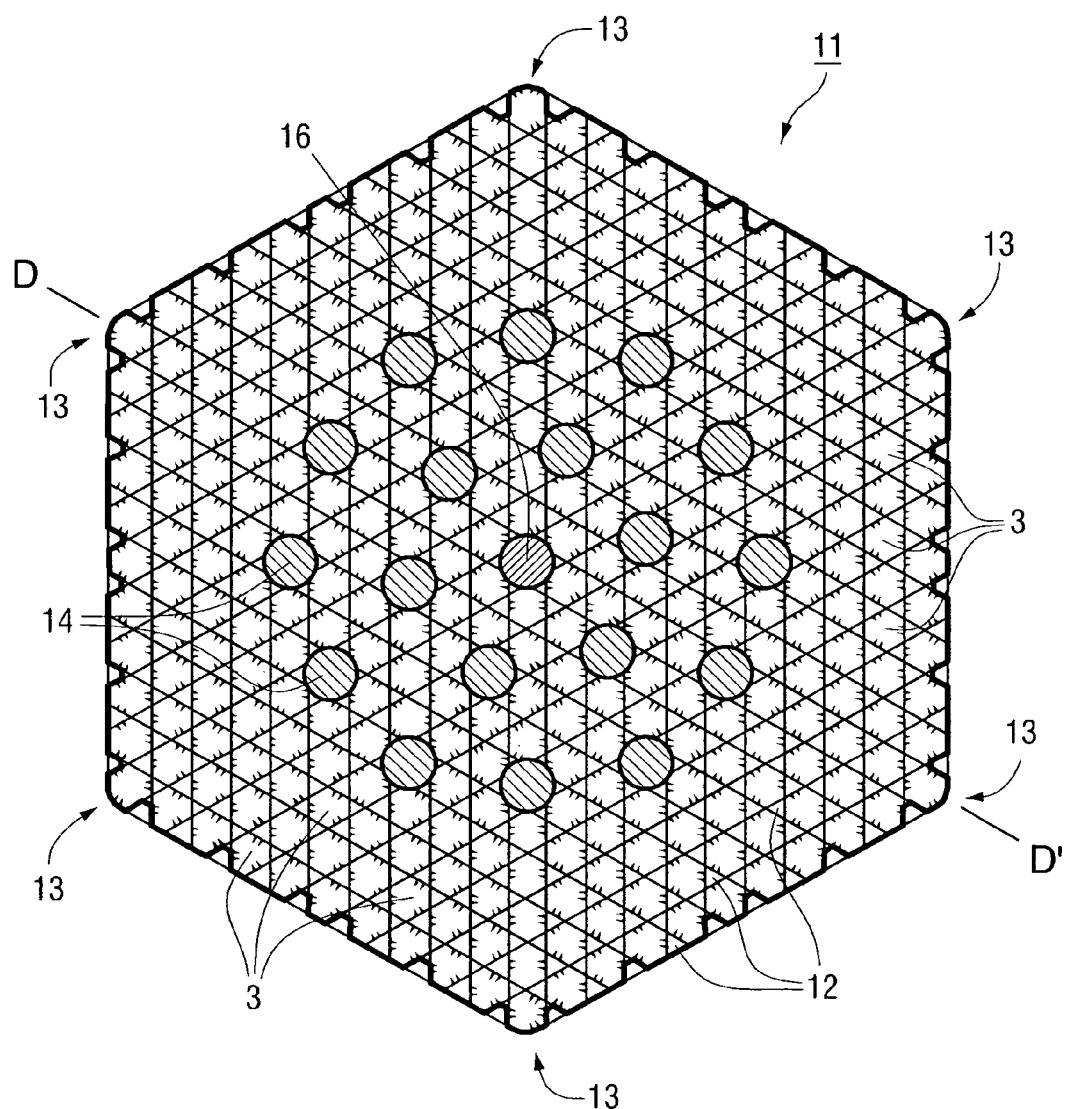

As previously noted, the substitution of fuel rods with one or more structural support replacement rods in accordance with the invention will improve the structural stability and skeletal rigidity of the entire fuel assembly. This will make the fuel assembly more resistant to distortion/bow and twist during irradiation, and more capable of maintaining rigidity under increased fuel burn-up management. Thus, the structural support replacement rods serve as skeletal structural elements of the fuel assembly. To provide additional rigidity to the skeletal structure, the replacement rods may be anchored, crimped, welded, or otherwise suitably secured to the grids and/or the nozzles of the fuel assembly. In other words, several different structural support replacement rod embodiments are disclosed. For example, and without limitation, in one embodiment the structural support replacement rods could be anchored to the grids of the fuel assembly and to the top and bottom nozzles of the fuel assembly. In another embodiment, the structural support replacement rods may not be anchored or fixedly secured to the grids but could be connected to the nozzles. Alternatively, the structural support replacement rods may not be anchored to the grids and are also not connected to the top and bottom nozzles. Finally, as shown for example in FIG. 9, which is a vertical elevation view of the fuel assembly 28 of FIG. 3, the structural support replacement rods 38 of the fuel assembly 28 may be anchored only to the grids 5, 7, 9, 10. Thus, in the embodiment of FIGS. 3 and 9, like the fuel rods 30 (see also fuel rods 3 of FIGS. 1b, 1c and 1d) that they replace, the exemplary structural support replacement rods 38 are not connected to either of the top end (e.g., top nozzle 6) of the fuel assembly 28 or the bottom end (e.g., bottom nozzle 8) of the fuel assembly 28, together or individually.

When fuel rods are replaced, there is a subsequent reduction of fuel material loading in the nuclear reactor which must be addressed. For example, when six fuel rods are replaced, fuel material loading may decrease by approximately two percent. To compensate for the loss in fuel, the pellet stack length or fuel density may be increased for each remaining fuel rod. By way of example, in which six fuel rods are replaced with six replacement rods, the pellet stack length of each remaining fuel rod may be increased by two pellets resulting in a total increase in fuel density of up to about 96.5% theoretical density (TD). The present invention, however, is not limited to any particular fuel density. It will, therefore, be appreciated that the fuel density may be increased higher than 96.5%.

The invention will be more fully understood with reference to the following example which is intended to illustrate the invention and should not be construed as limiting the scope of the invention in any way.

EXAMPLE

Figure 8:
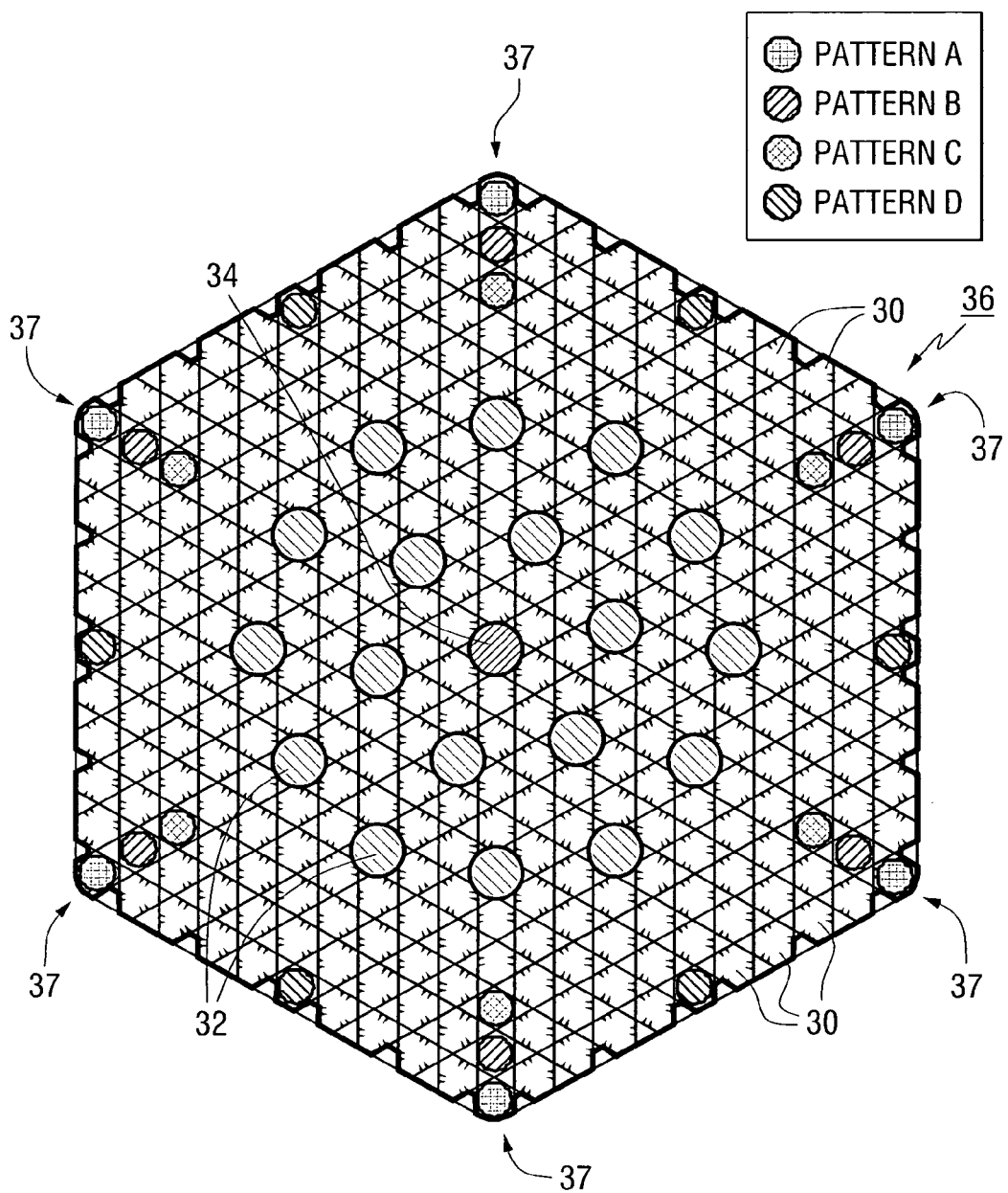
FIG. 8 presents a cross-sectional view of a fuel assembly having a hexagonal array in accordance with various embodiments of the present invention.

FIG. 8 presents four different structural support replacement rod configurations or patterns in accordance with the invention. The patterns are denoted in the legend of FIG. 8 as Pattern A, Pattern B, Pattern C, and Pattern D. For each pattern, six structural support replacement rods made from zirconium were positioned in the fuel assembly 36 having hexagonal geometric array 36. For Pattern A, it was assumed that the structural support replacement rods were positioned adjacent to the corners 37 of the hexagonal array 36. For Pattern B, it was assumed that the structural support replacement rods were positioned one fuel rod 30 away from the corners 37 of the hexagonal array 36. For Pattern C, it was assumed that the structural support replacement rods were positioned two fuel rods 30 away from the corners 37 of the hexagonal array 36. For Pattern D, it was assumed that the structural support replacement rods were positioned approximately halfway in between the corners 37 of the hexagonal array 36.

Modeling calculations were conducted to provide a skeleton stiffness assessment and nuclear assessment for Patterns A-D. The assessments were also conducted for a reference fuel assembly that contained no replacement rods. Patterns A-D were tested twice for two different types of replacement rods. The first type of replacement rod was solid zirconium, and the second type of replacement rod was hollow zirconium with an inside and outside diameter. Table 1 presents the results of the skeleton stiffness assessment, including skeleton moment of inertia in inches and bending stiffness benefit.

TABLE 1

Skeleton Stiffness Assessment

| Pattern | Guide Thimbles (19 Places) ID | Guide Thimbles (19 Places) OD | Fuel Rod Replacement (6 places) ID | Fuel Rod Replacement (6 places) OD | Skeleton Moment of Inertia, inch$^4$ | Bending Stiffness Benefit |
|---|---|---|---|---|---|---|
| Reference | 0.433" | 0.496" | — | — | 2.07 | 1.0 |
| A | | | | 0.360" | 2.07 + 7.70 = 9.77 | 4.7 |
| B | | | | | 2.07 + 6.24 = 8.31 | 4.0 |
| C | | | | | 2.07 + 4.93 = 7.00 | 3.4 |
| D | | | | | 2.07 + 5.78 = 7.85 | 3.8 |
| A | | | 0.433" | 0.496" | 2.07 + 3.48 = 5.55 | 2.7 |
| B | | | | | 2.07 + 2.82 = 4.89 | 2.4 |
| C | | | | | 2.07 + 2.23 = 4.30 | 2.1 |
| D | | | | | 2.07 + 2.61 = 4.68 | 2.3 |

As shown, all of the fuel assemblies employing replacement rods displayed a higher bending stiffness benefit than the reference fuel assembly that contained no replacement rods. Additionally, the solid replacement rods displayed a higher bending stiffness benefit than the hollow replacement rods. Pattern A, with solid zirconium replacement rods, displayed the maximum skeleton stiffness benefit of 4.7. Pattern B, with solid zirconium replacement rods, displayed the next highest bending stiffness benefit (4.0), followed by Pattern D (3.8) and Pattern C (3.4) with solid zirconium rods.

Table 2 presents the results of nuclear assessment calculations.

TABLE 2

Nuclear Assessment

| Pattern | Fuel Density | Peaking Factor min | Peaking Factor max | Peaking Factor Difference | Reactivity Change (BOL), pcm |
|---|---|---|---|---|---|
| Reference | 95% TD | 0.908 | 1.056 | 0.148 | — |
| A | 97% TD | 0.952 | 1.045 | 0.093 | −60 |
| B | | 0.933 | 1.085 | 0.152 | −40 |
| C | | 0.928 | 1.059 | 0.131 | +102 |
| D | | 0.904 | 1.045 | 0.141 | +94 |

BOL = Beginning of life
pcm = percent-mille = 0.00001 change in k/k in core reactivity More specifically, among the assessed parameters were the peaking factor and the reactivity change. Peaking factor represents the ratio of heat generation versus average heat generation. The difference between the minimum and maximum peaking factor is preferably a low number. Reactivity change represents the change in nuclear reactivity that occurs when fuel rods are replaced by one or more replacement rods, and it is preferable for this change to be negligible, regardless of whether it is positive or negative. For the EXAMPLE, the reference fuel assembly was assumed to contain a fuel density of 95% TD, and the fuel assemblies of Patterns A-D were assumed to contain a fuel density of 97% TD each. For Patterns A-D, it was assumed that solid zirconium bars (outside diameter=0.360 inches) were used as replacement rods.

As shown in Table 2, Pattern A displayed the narrowest distribution range between the maximum and minimum peaking factor (a difference of 0.093), and a small reactivity change (−60), followed by Pattern C with a peaking factor difference of 0.131 and Pattern D with a peaking factor difference of 0.141. Pattern B displayed a higher peaking factor difference (0.152) than the reference fuel assembly (0.148). Thus, it was determined that zirconium replacement rods (outside diameter=0.360 inches) in six locations as specified in Patterns A and C, where the pellet TD (nominal) is equal to or greater than 96.5%, are the most appropriate design solutions to support the proposed fuel management (high burn-up up to 75,000 MWD/MTU and extended resident time up to 6 years). Furthermore, it was determined that the positioning and number of the replacement rods for any geometric array can be determined by balancing three important factors: reactivity, lateral stiffness, and peaking factors.

Whereas particular embodiments of this invention have been described above for purposes of illustration, it will be evident to those skilled in the art that numerous variations of the details of the present invention may be made without departing from the invention as defined in the appended claims.

What is claimed is:

1. A fuel assembly for a pressurized water nuclear reactor, the fuel assembly forming a geometric array having a periphery, the fuel assembly comprising:
    a top nozzle;
    a bottom nozzle disposed opposite and distal from the top nozzle;
    a plurality of fuel rods disposed intermediate the top nozzle and the bottom nozzle;
    a plurality of guide thimbles;
    at least one instrumentation tube;
    at least one structural support replacement rod; and
    a plurality of grids that are structured and arranged in a tandem array to support the fuel rods, the guide thimbles, the at least one instrumentation tube, and the at least one structural support replacement rod in a spatial relationship in the geometric array such that the at least one structural support rod does not engage adjacent fuel rods or guide thimbles,
    wherein the guide thimbles and the at least one structural support replacement rod are anchored to the grids,
    wherein at least one of the at least one structural support replacement rod is disposed at or about the periphery of the geometric array in order to provide enhanced structural stability to the fuel assembly, and
    wherein said at least one structural support replacement rod is not connected to either of said top nozzle or said bottom nozzle together or individually.

2. The fuel assembly of claim 1, wherein the at least one structural support replacement rod is made from zirconium alloy.

3. The fuel assembly of claim 1, wherein the at least one structural support replacement rod is solid.

4. The fuel assembly of claim 1, wherein the fuel assembly includes between three and six structural support replacement rods.

5. The fuel assembly of claim 1, wherein the fuel assembly includes 306 fuel rods, 18 control rods, 18 guide thimbles, 1 instrumentation tube, and 6 structural support replacement rods.

6. The fuel assembly of claim 1, wherein the geometric array is non-circular.

7. The fuel assembly of claim 6, wherein the geometric array is selected from the group consisting of a hexagon and a square.

8. The fuel assembly of claim 1, wherein the periphery of the geometric array has a plurality of corners; and wherein the at least one structural support replacement rod is disposed at or about a corresponding one of the corners.

9. A pressurized water nuclear reactor comprising:
    a pressure vessel; and
    a plurality of a fuel assemblies housed by the pressure vessel, each of the fuel assemblies forming a geometric array having a periphery and comprising:
        a top nozzle,
        a bottom nozzle disposed opposite and distal from the top nozzle,
        a plurality of fuel rods disposed intermediate the top nozzle and the bottom nozzle,
        a plurality of guide thimbles,
        at least one instrumentation tube,
        at least one structural support replacement rod, and
        a plurality of grids that are structured and arranged in a tandem array to support the fuel rods, the guide thimbles, the at least one instrumentation tube, and the at least one structural support replacement rod in a spatial relationship in the geometric array such that the at least one structural support rod does not engage adjacent fuel rods or guide thimbles,
    wherein the guide thimbles and the at least one structural support replacement rod are anchored to the grids,
    wherein at least one of the at least one structural support replacement rod is disposed at or about the periphery of the geometric array in order to provide enhanced structural stability to the fuel assembly, and
    wherein said at least one structural support replacement rod is not connected to either of said top nozzle or said bottom nozzle together or individually.

10. The nuclear reactor of claim 9, wherein the at least one structural support replacement rod is made from zirconium alloy.

11. The nuclear reactor of claim 9, wherein the at least one structural support replacement rod is solid.

12. The nuclear reactor of claim 9, wherein the fuel assembly includes between three and six of said structural support replacement rods.

13. The nuclear reactor of claim 9, wherein the geometric array is non-circular.

14. The nuclear reactor of claim 13, wherein the geometric array is selected from the group consisting of a hexagon and a square.

15. The nuclear reactor of claim 9, wherein the periphery of the geometric array has a plurality of corners; and wherein the at least one structural support replacement rod is disposed at or about a corresponding one of the at least one corners.

* * * * *